(No Model.) 2 Sheets—Sheet 1.
J. W. BLODGETT.
BUTTON HOLE ATTACHMENT FOR SEWING MACHINES.
No. 342,321. Patented May 25, 1886.
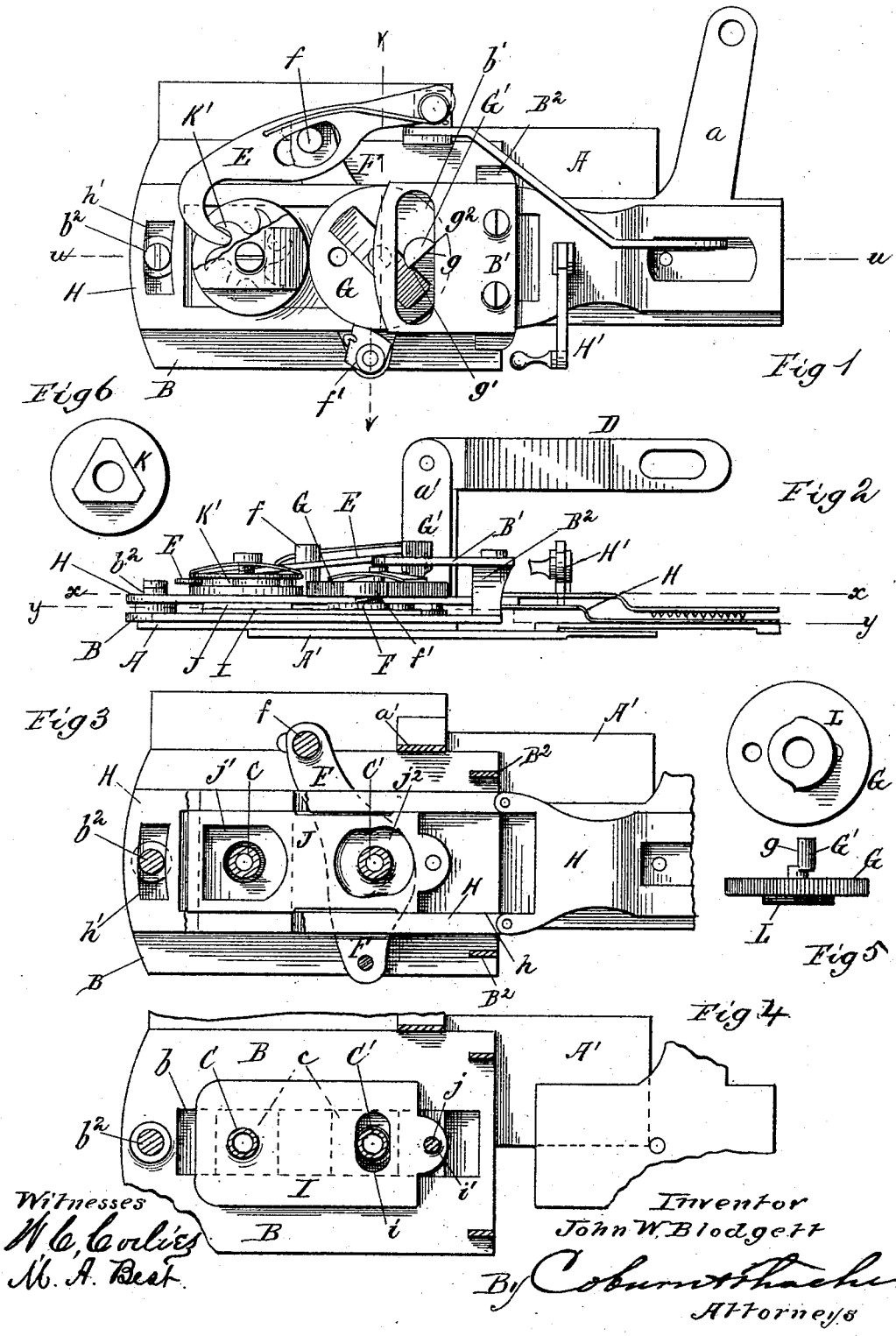
Witnesses
W. C. Corlies
M. A. Best
Inventor
John W. Blodgett
By Coburn & Thacher
Attorneys (No Model.) 2 Sheets—Sheet 2.
J. W. BLODGETT.
BUTTON HOLE ATTACHMENT FOR SEWING MACHINES.
No. 342,321. Patented May 25, 1886.
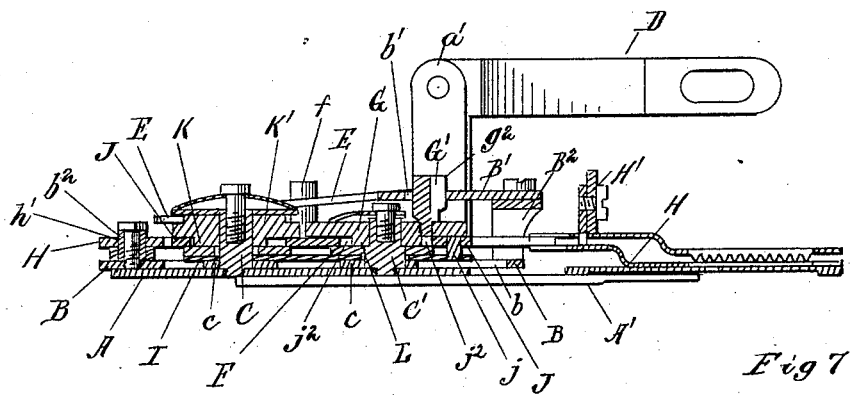
Fig 7
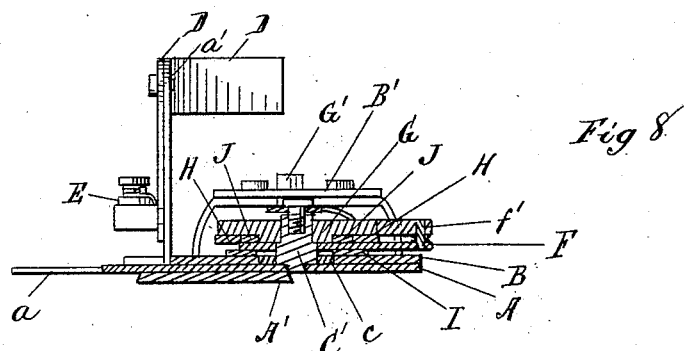
Fig 8
Fig 10
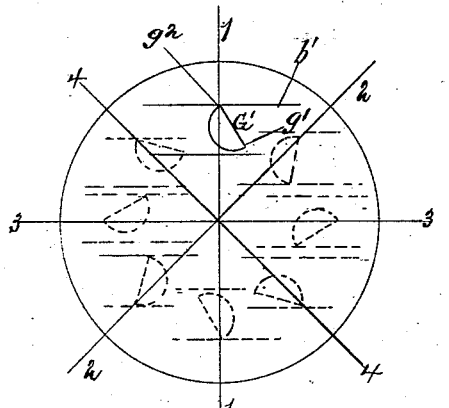
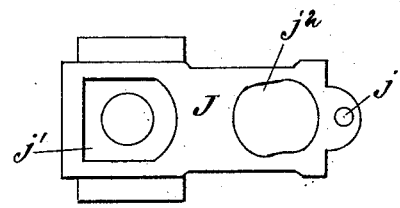
Fig 9
Witnesses
W. C. Corlies
M. A. Best
Inventors
John W Blodgett
By Coburn & Thacher
Attorneys
N. PETERS, Photo-Lithographer, Washington, D. C.

UNITED STATES PATENT OFFICE.

JOHN W. BLODGETT, OF HIGHWOOD, ASSIGNOR TO FRANK M. BLAIR, OF CHICAGO, ILLINOIS.

BUTTON-HOLE ATTACHMENT FOR SEWING-MACHINES.

SPECIFICATION forming part of Letters Patent No. 342,321, dated May 25, 1886.

Application filed September 24, 1885. Serial No. 178,106. (No model.)

*To all whom it may concern:*

Be it known that I, JOHN W. BLODGETT, a citizen of the United States, residing at Highwood, in the county of Lake and State of Illinois, have invented a certain new and useful Improvement in Button-Hole Attachments for Sewing-Machines, of which the following is a full description, reference being had to the accompanying drawings, in which—

Figure 1 represents a plan view of my improved button-hole attachment; Fig. 2, a side elevation of the same; Fig. 3, a plan section of the same, taken on the line $x\ x$ of Fig. 2; Fig. 4, a similar section taken on the line $y\ y$ of Fig. 2; Fig. 5, a detail view of the ratchet-wheel which operates the feed and change or switch motion; Fig. 6, a bottom plan view showing the triangular cam which operates the oscillating plate; Fig. 7, a central longitudinal section taken on the line $u\ u$ of Fig. 1; Fig. 8, a transverse section taken on the line $v\ v$ of Fig. 1; Fig. 9, a detail plan view of the guide-plate detached; and Fig. 10 a diagram illustrating the operation of the feed-equalizer.

Like letters refer to like parts in all the figures of the drawings.

In an application filed by me September 7, 1885, Serial No. 176,440, I have shown and described a button-hole attachment for sewing-machines, which is more particularly adapted for use in factories and other large establishments.

My present invention relates, principally, to a more simplified form of button-hole attachment, which, although capable of general use, is more particularly intended for employment in connection with sewing-machines for domestic use.

My invention also relates to certain improvements in a feeding mechanism, whereby a much simplified and highly-efficient feed motion is produced.

I will now proceed to describe a construction in which I have practically carried out my invention in one form, and will then particularly point out in the claims those features which I deem to be new and desire to protect by Letters Patent.

In the drawings, A represents the bed-plate of the machine, which is constructed to receive the remaining parts, and is adapted to be attached to the cloth-plate of the sewing-machine in any suitable manner, the means shown in the present instance consisting of a dovetailed plate, A', which fits in a corresponding groove in the cloth-plate, and an arm, $a$, which is secured to the cloth-plate by a screw to prevent the displacement of the attachment when in position.

B indicates the feed-plate, which is mounted on the bed-plate A, being provided with a slot, $b$, extending almost its entire length, within which slot are arranged guide-pieces $c$, which are held in position by means of posts C C', secured to the bed-plate A. This feed-plate has mounted upon it in the manner hereinafter described the oscillating plate which carries the cloth-clamp, and has imparted to it an intermittent reciprocating motion by means of the following mechanism:

D indicates the operating-lever mounted on a post, $a'$, secured to the bed-plate A, and E a slotted hook-pawl pivoted to the operating-lever, these parts being constructed substantially as in my other application hereinbefore specified.

F indicates a lever mounted on the post C', and provided at one end with a pin or projection, $f$, to engage with the slot in the pawl E, and at the other end with a serrated spring-pawl, $f'$, to engage with a ratchet-wheel, G, mounted on the post C'. The ratchet-wheel G is provided with a pin or projection, G', secured to it in any suitable manner, the said pin being arranged to engage with a straight transverse slot, $b'$, in a plate, B', secured to a yoke, B², mounted on the feed-plate B. It is obvious that as the ratchet-wheel is intermittently rotated by the action of the pawl $f'$ on the lever end, an intermittent reciprocation will be imparted to the feed-plate B by the action of the pin G' in the slot $b'$. If the pin G' were an ordinary cylindrical pin, the steps of the feed-motion would be irregular— that is to say, during the movement of the feed-plate in one direction these steps would gradually increase in length until half of the movement was completed, and would then decrease until the feed-plate had completed its travel in that direction. In other words, the pin G' starting from a position on the central line of the feed-plate and describing a semicircle would have its greatest throw when one-half of the semicircle had been traversed, the throw increasing up to this point and then decreasing until the pin was again in line at the other end of the semicircle. This operation would produce stitches of unequal length, and in order to overcome this objection I employ a pin of such a construction that the feed shall be practically equal at all points of its stroke. In the present instance the pin is shown as semi-cylindrical in shape, being provided with a flat surface, $g$, terminating in corners $g'$ and $g^2$. This pin is so arranged that the surface $g$ stands at an angle to the radius of the wheel G, upon which it is mounted, this angle being varied to a greater or less extent, according to circumstances. Owing to this position of the pin the corner $g'$ is much nearer the center of the ratchet-wheel than is the corner $g^2$, and consequently when in contact with the wall of the slot $b'$, will move the feed-plate to a much less extent than when the corner $g^2$ is in contact therewith. The operation of this construction will be readily perceived from a consideration of the diagram shown in Fig. 10 of the drawings. Starting from a position with the pin G' on the line 1 1 of the diagram, when the feed-plate has completed its motion in one direction, and the needle is at the end of the button-hole, the rotation of the ratchet-wheel has at first no effect upon the feed-plate, since the pin is arranged at such an angle in the slot $b'$ that it does not completely fill the same. For the first few strokes the feed-motion is slight, but during the motion of the pin from the line 2 2 to the line 4 4 the rate of feed is practically equal, while from this point to the line 1 1 it would be greatly diminished with a cylindrical pin. Just before the pin reaches its position on the line 4 4, however, it assumes such a position relatively to the slot that the corner $g^2$ thereof, which is farthest from the center, engages with the wall of the slot, and, having a greater throw than the inner corner, $g'$, will counteract this tendency to decrease the steps of the feed, and will make the rate of feed practically identical during all the steps of the semicircle, except immediately at the ends.

Instead of the semi-cylindrical pin shown an elliptical pin, or a square one, may be employed with similar results; or other similar non-cylindrical forms may be substituted. It is obvious that this feed motion is not limited in its application to the particular form of attachment shown and described, and I do not wish to be understood as so limiting it.

H indicates the oscillating plate, to which the cloth-clamp H' is attached. These parts are constructed substantially as in my application hereinbefore specified, the plate H being provided with a central longitudinal slot, $h$, and with a curved transverse slot, $h'$, at its rear end, through which passes a post, $b^2$, attached to the feed-plate B, by means of which post the motion of the feed-plate is communicated to the oscillating plate H.

I indicates a plate, pivoted upon the post C and resting upon the feed-plate B. This plate is provided with a transverse slot, $i$, through which the post C' passes, so as to permit the plate I to oscillate upon the post C, and is further provided with a hole, $i'$, to receive a pin, $j$, attached to the guide-plate J, which is thus pivoted to the plate I by means of this pin. The guide-plate J fits within the slot $h$ in the oscillating plate H, and is provided with a recess, $j'$, in which operates a triangular cam, K, provided with a ratchet-wheel, K', actuated by the hook-pawl E, as in my application hereinbefore specified, the cam and ratchet-wheel being mounted upon the post C, as shown. By means of this cam the plate J is caused to oscillate upon the pivot $j$, thereby causing a similar oscillation of the plate H and of the cloth-clamp attached thereto, this motion producing the overseaming-stitch necessary to form the button-hole. Near the forward end of the guide-plate J is a recess, $j^2$, shaped substantially as shown, in which fits a cam, L, on the under side of the ratchet-wheel G. This cam at the end of each half-revolution of the ratchet-wheel throws the plates J and I over from one side to the other, carrying with them the plate H and the cloth-clamp, thus producing the change or switch motion necessary to enable the machine to operate upon the other edge of the button-hole after one edge is completed.

From the above description, taken in conjunction with the description contained in my application hereinbefore specified, the operation of the device will be readily understood, and therefore needs no detailed description here. It will be at once seen that the attachment is much simpler and less complicated than that described in my prior application, it not being capable, however, of the numerous adjustments which this latter provides for. It may, however, be adjusted to operate upon button-holes of various lengths by locating the pin G' farther from or nearer to the center of the ratchet-wheel G, and this may be accomplished either by providing a series of apertures for the said pin, located at different distances from the center, or by making the pin adjustable in a radial slot in the ratchet-wheel.

I am aware of Letters Patent No. 306,604, granted October 14, 1884, to W. H. Gilbert, which show a feed-plate, a slotted plate connected thereto, and a heart-shaped cam secured to a revolving disk and operating within the slot to reciprocate the feed-plate, and I therefore do not wish to be understood as claiming such a construction.

It is obvious that various modifications in the details of construction may be made without departing from the principle of my invention, and I therefore do not wish to be understood as limiting myself strictly to the precise details of construction hereinbefore described, and shown in the drawings.

Having thus described my invention what I claim as new, and desire to secure by Letters Patent, is—

1. In a button-hole attachment, the combination, with the feed-plate and the slotted plate attached thereto, of the feed-wheel and a semi-cylindrical pin mounted thereon and working in the slot, substantially as specified.

2. In a button-hole attachment, the combination, with the slotted plate attached to the feed-plate, of the feed-wheel and a pin having a plane or flattened surface arranged at an angle to the radius of the wheel and engaging the slotted plate, substantially as and for the purposes set forth.

3. The combination, with the feed plate B and plate B′, slotted transversely at b′, of the feed-wheel G, having pin G′, provided with the non-radial surface g, substantially as and for the purposes set forth.

4. In a button-hole attachment, the combination, with the feed-plate and the slotted plate attached thereto, of the ratchet-wheel provided with a pin to engage with the slot thereof, the feed-lever provided with a pawl to operate the ratchet-wheel and with a pin or projection, the operating-lever, and the hook-pawl slotted to receive the pin on the feed-lever, substantially as and for the purposes specified.

5. In a button-hole attachment, the combination, with the slotted plate which carries the cloth-clamp, of the guide-plate arranged in the slot thereof and the triangular cam arranged in a recess in the guide-plate, substantially as and for the purposes set forth.

6. In a button-hole attachment, the combination, with the slotted cloth-clamp plate, of the guide-plate arranged in the slot and the switch and triangular cams arranged to operate in recesses in the guide-plate, substantially as and for the purposes set forth.

7. In a button-hole attachment, the combination, with the slotted plate which carries the cloth clamp, of the switch-plate pivoted to a fixed post, the guide-plate pivoted to the switch-plate, and the switch-cam arranged to operate in a recess in the guide-plate, substantially as and for the purposes set forth.

8. In a button-hole attachment, the feed-plate and the oscillating plate mounted thereon, in combination with the pivoted switch-plate, the guide-plate pivoted to the switch-plate, and the switch and triangular cams arranged to operate in recesses in the guide-plate, substantially as and for the purposes set forth.

9. The combination, with the bed-plate A and posts C and C′, of the switch-plate I, pivoted on the post C and slotted at i to accommodate the post C′, and the guide-plate pivoted to the switch-plate, substantially as and for the purposes specified.

10. The combination, with the switch-plate I, pivoted on the post C and provided with the hole i′, of the guide-plate J, provided with a pin, j, fitting within the hole i′, substantially as and for the purposes specified.

JOHN W. BLODGETT.

Witnesses:
IRVINE MILLER,
A. M. BEST.